(12) United States Patent
Cook et al.

(10) Patent No.: US 11,128,171 B1
(45) Date of Patent: Sep. 21, 2021

(54) SUPPLEMENTAL ELECTROMAGNETIC CIRCUIT

(71) Applicant: Global Energy Applications, LLC, Bartow, FL (US)

(72) Inventors: Brian K. Cook, Bartow, FL (US); Mark M. Turner, Greenacres, FL (US)

(73) Assignee: Global Energy Applications, LLC, Bartow, FL (US)

( * ) Notice: Subject to any disclaimer, the term of this patent is extended or adjusted under 35 U.S.C. 154(b) by 0 days.

(21) Appl. No.: 17/119,356

(22) Filed: Dec. 11, 2020

(51) Int. Cl.
*H02J 50/10* (2016.01)

(52) U.S. Cl.
CPC ..................... *H02J 50/10* (2016.02)

(58) Field of Classification Search
CPC ........................................... H02J 50/10
See application file for complete search history.

(56) References Cited

U.S. PATENT DOCUMENTS

| | | | | |
|---|---|---|---|---|
| 3,406,327 A * | 10/1968 | Mapham | ............... | H02M 7/523 363/135 |
| 3,492,563 A * | 1/1970 | Myer | .................. | H03G 3/3005 323/229 |
| 3,697,840 A * | 10/1972 | Koch | .................. | H02P 25/0925 318/254.1 |
| 5,331,534 A * | 7/1994 | Suzuki | .................. | H02M 1/425 363/20 |
| 6,137,698 A * | 10/2000 | Yukawa | ............ | H02M 3/33576 363/127 |
| 7,187,531 B1 * | 3/2007 | Chen | ...................... | H02H 7/125 361/111 |
| 7,265,650 B2 * | 9/2007 | Jang | ......................... | H01F 30/06 336/212 |
| 10,742,158 B1 * | 8/2020 | Cook | ........................ | H02P 4/00 |
| 2004/0135554 A1 * | 7/2004 | Clingman | .............. | H02N 2/181 320/166 |
| 2005/0276084 A1 * | 12/2005 | Wai | ........................ | H02M 1/34 363/98 |
| 2007/0040644 A1 * | 2/2007 | Jang | ......................... | H01F 30/06 336/215 |
| 2007/0081368 A1 * | 4/2007 | Wai | ......................... | H02M 7/48 363/98 |
| 2014/0029312 A1 * | 1/2014 | Telefus | ............. | H02M 3/33523 363/21.02 |
| 2015/0288352 A1 * | 10/2015 | Krause | .................... | H02J 5/005 327/140 |
| 2021/0044140 A1 * | 2/2021 | Nagabhushanrao | .. | H02M 5/458 |

* cited by examiner

*Primary Examiner* — Jared Fureman
*Assistant Examiner* — Michael J Warmflash
(74) *Attorney, Agent, or Firm* — McHale & Slavin, P.A.

(57) ABSTRACT

An electromagnetic generation circuit that works with a dedicated load in a closed circuit to generate electromagnetic fields responding to one half of a normal alternating current sine wave on an inductor. The circuit makes it possible to generate electromagnetic fields away from or externally from the dedicated load while maintaining sine wave integrity.

3 Claims, 3 Drawing Sheets

SUPPLEMENTAL ELECTROMAGNETIC CIRCUIT

FIELD OF THE INVENTION

This invention is directed to AC circuitry, and in particular, to a circuit for generating electromagnetic fields in a closed circuit utilizing AC currents in series with a dedicated load.

SUMMARY OF THE INVENTION

Disclosed is an electromagnetic generation circuit that works with a dedicated load in a closed circuit to generate electromagnetic fields responding to one half of a normal alternating current sine wave on an inductive, wherein the circuit makes it possible to generate electromagnetic fields away from or externally from the dedicated load while having little to no bearing on the load or any influence of how a load functions other than as a resistance factor only, while maintaining sine wave integrity.

An objective of the invention is to use core inductors in series with a dedicated load in a closed circuit to generate electromagnetic fields using one half of a normal alternating current sine wave on each inductor.

Another objective of the invention is to provide a circuit that makes it possible to generate electromagnetic fields away from or externally from a dedicated load while having no bearing on the load or any influence of how the load functions, other than the resistance of an inductor.

Still another objective of the invention is to provide a circuit wherein inductors with very low ohms have minimal effects on the overall circuit when connected to a dedicated load.

Another objective of the invention is to provide a circuit that allows for the generation of electromagnetic fields that generate magnetic flux based on dedicated loads current draw without using any current of its own, or interfering with the load or the installed circuit within the dedicated closed circuit.

Another objective of the invention is to provide a circuit and physically drive some type of generator in a linear fashion without using any current or disruption.

Other objectives and advantages and benefits associated with this invention will be apparent to those skilled in the art from the description, examples and the claims which follow.

DETAILED DESCRIPTION OF THE PREFERRED EMBODIMENT

A detailed embodiment of the instant invention is disclosed herein; however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Figure 1:
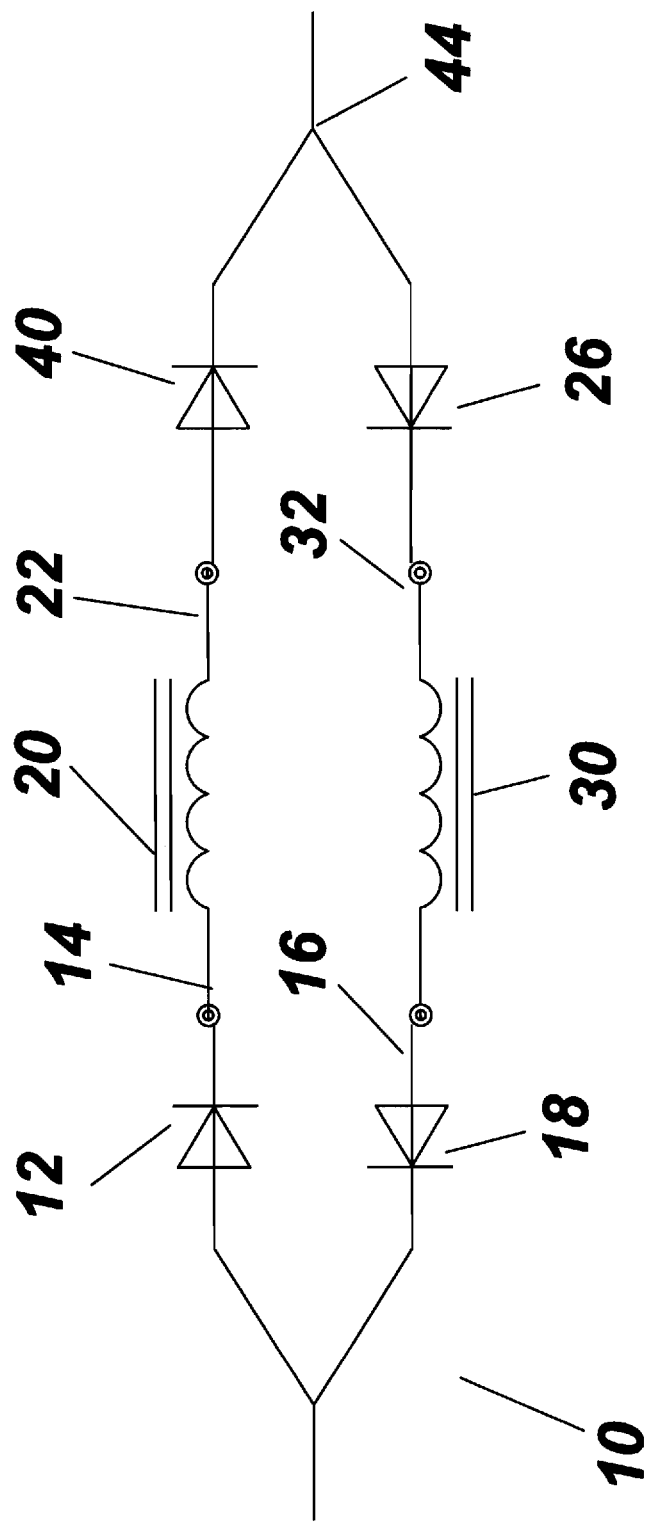
FIG. 1 is an electric schematic of an electromagnetic generation circuit of the instant invention employing two inductors.

Referring to FIG. 1, illustrated is an electromagnetic generation circuit that works with a dedicated load in a closed circuit to generate electromagnetic fields comprising an active hot lead 10 of an alternating current circuit connected in parallel to a forward bias diode 12 and reverse bias diode 18. The forward bias diode 12 connects to a first end 14 of a first inductor 20. Terminal 22 of the first inductor 20 has a lead 24 that couples to a second forward bias diode 40. The reverse bias diode 18 has a lead 16 that connects to a second inductor 30 with a lead 32 that connects the second inductor 30 to a second reverse bias diode 26. The diodes, 26 and 40 are coupled together along connection 44 which is designated as the active hot lead of the dedicated load capable of maintaining a pure sine wave. The terminal connected at the dedicated load will be the normal connection to a neutral line connection so that the circuit is in series with and before the dedicated load on the active hot lead if the circuit is a split phase or single phase circuit requiring a neutral. All current required by the dedicated load has to pass within the inductors 20 and 30.

The circuit of FIG. 1 makes it possible to generate electromagnetic fields away from or externally from the dedicated load, while having little or no bearing on the load or any influence of how the load functions other than the resistance of the circuit coils. Inductors with low ohms have minimal effects on the overall circuit, especially when connected in a load that is purely inductive. The circuit allows for full current usage based on what the dedicated load requires, allowing alternating time based electromagnetic fields switching between the two inductors, 20 and 30.

Figure 2:
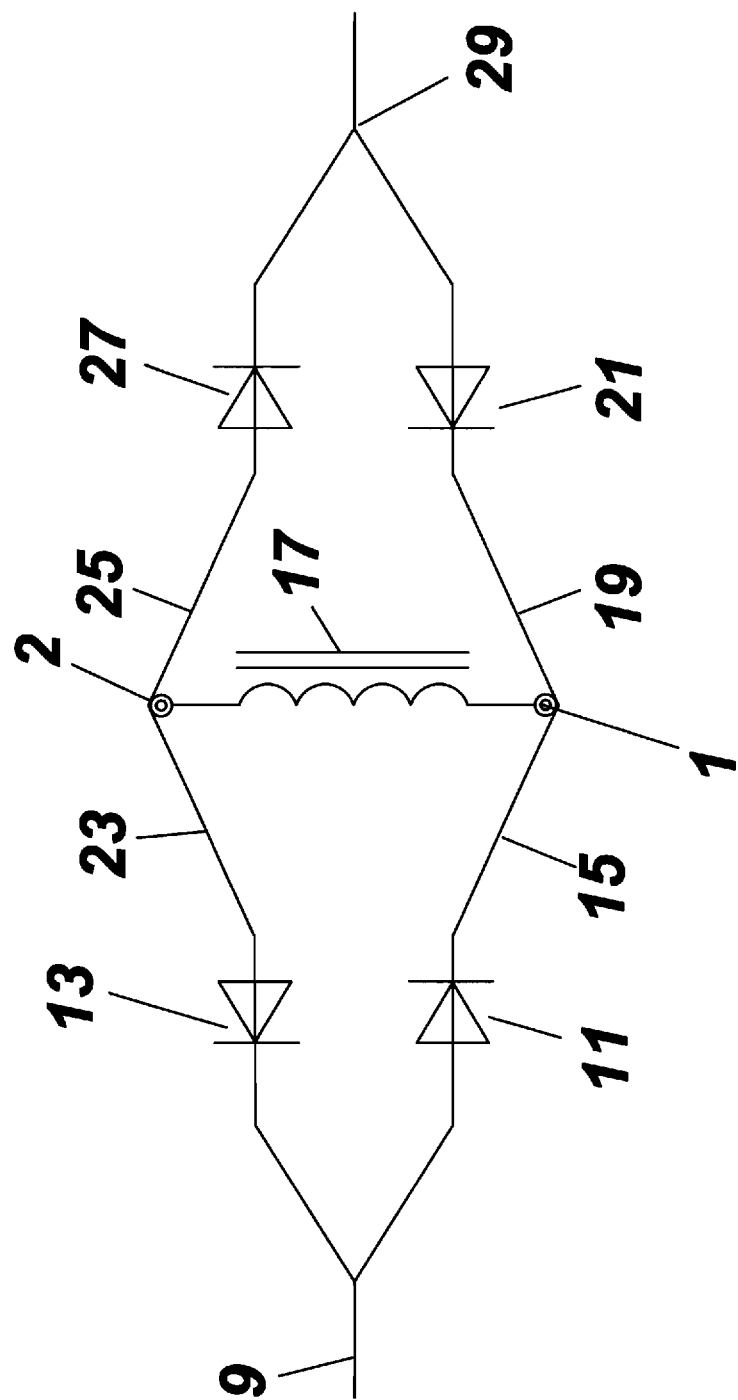
FIG. 2 is an electric schematic of an electromagnetic generation circuit of the instant invention employing one inductor.

Referring to FIG. 2, an alternative embodiment for an electromagnetic generation circuit that works with a dedicated load in a closed circuit to generate electromagnetic fields wherein the circuit employs one inductor. In this embodiment an active hot lead 9 couples to a forward bias diode 11 and a reverse bias diode 13. A lead connection 15 from the forward bias diode 11 connects to an inductor 17 at terminal 1, and from terminal 1 a lead 19 connects terminal 1 of inductor 17 to a reverse bias diode 21.

The active hot lead 9 also connects to a reversed bias diode 13 having a lead 23 that connects a reversed bias diode 13 to the inductor 17 at terminal 2. Terminal 2 of inductor 17 and then coupled by a lead 25 to a forward bias diode 27. Diodes 21 and 27 are coupled through connection 29 that is then secured to a dedicated load. In this embodiment the inductor 17 pulses an electromagnetic field at the same frequency as the alternating current, but representative of a DC current. The electromagnetic fields generated can be used for their mechanical abilities, such as lifting or moving something because they pulse at 60 hertz, vibrations.

Current always provides an electromagnetic field when the current is present, wherein the magnetic field has a rotational direction. In this embodiment, field lines are separated into two sides, the positives and the negatives, or provided on opposite sides of a common inductor with no field line change. If there is no field line change, the circuit is not disrupted and it generates a magnetic field. Magnetic fields become usable for any number of things; the single setup does not change anything, the setup only creates a magnetic field that deploys AC sine waves.

Figure 3:
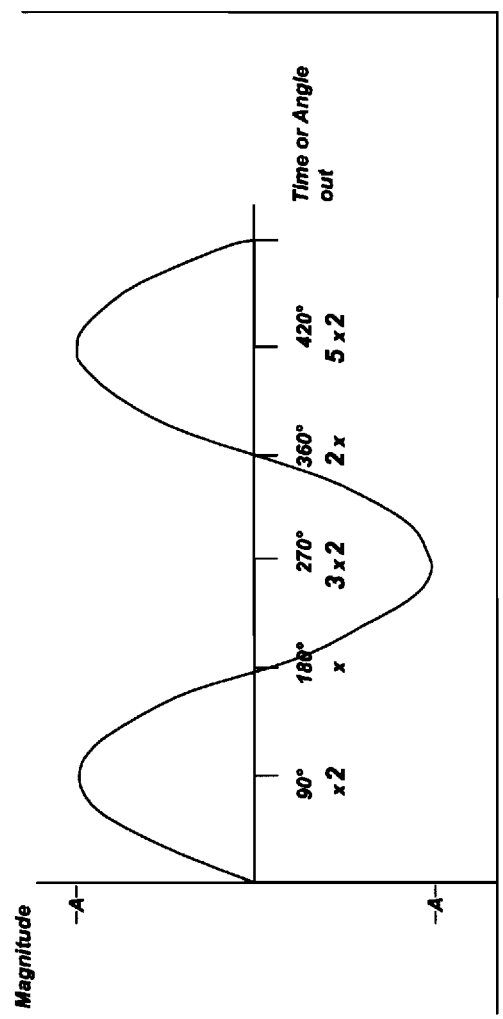
FIG. 3 is a pure sine wave graph.

For example, current reduction tests were conducted using inductive loads. An AC blower fan with a current load of 155 watts was tested. Using the double setup, current reduction was about 3 percent for the primary load. A second test was conducted using a 600 watt AC blower fan and current reduction was at about 3.5 percent. Testing for sine wave integrity showed that in both configurations, the single setup and the double setup, a pure unaltered sine wave resulted when tested at any point within the circuit, as depicted in FIG. 3.

In one example using a single inductor, employing a 12-volt motor sized for operation of 5 amps applied 300 watts, allowed it to operate at 2½ amps. Because the amperage is only half of what the motor was designed for, the motor did not heat up. In another example, placing 600 watts across a motor designed for 5 amps indicates that the higher wattage has no effect as the amperage is providing the driving power.

In another example, a double can be used to achieve an alternating back and forth electromagnetic pulse. The pulses are perfectly timed at 60 hertz so when the inductors are separated, such as placing a metal piece in between them, then it pulses back and forth, providing a linear movement. A linear generator on a straight shaft moves from side to side. Still another example is coupling of the circuit to a solar panel system. If a solar panel system outlet is 600 watts, and even if there are circuit losses of 3% of that 600 watts, the increase in power would be about 20% with the 3% loss, providing a 17% increase with a specific style linear generator.

The active hot lead 10 can be fed from a wall socket, a transformer, a panel box, a generator, or out of a solar panel, as long as it was already converted to AC. The power line parallels the two diodes 12, 40 so the positive sine would go through the forward bias diode 12, which is connected to an inductor 20, which could be an air core, an iron core, or a solenoid style core, as long as it can generate a magnetic field. And then the other lead 22 of that connects to the other diode 40 in the forward bias position, which then parallels back to a feed line again, and on to a series connection 44. The negative only responds to those because they are reversed. Per FIG. 3, a labscope tested anywhere in the circuit, whether it be at number 10, at number 44, at number 20 or 30, the scope will always depict a perfect sine wave. You do not see what they refer to as rectification. So it enters at a full sine, it's a full sine within the center, and it exists as a full sine, so whatever's attached onto lead 44, number 44, which goes to a dedicated load, is seeing a normal sine. There is no disruption in the sine wave whatsoever.

FIG. 2 depicts an active hot lead 9 that is split between a forward bias diode 11 and a reverse bias diode 13, which is attached to a single 17 inductor. Essentially, there is a rectification. For instance if AC has a bridge rectifier, and two leads off the bridge rectifier are placed on a single inductor, negative would be on one side and positive on the other side. In this embodiment, reverse bias diode 13 only interacts with reverse bias diode 21, because it is a negative. A bridge rectifier is known as a referencing bridge rectifier with a center tap transformer. If you do not use a center tap transformer, but use both leads to a rectifier, there will be negative on one side and positive on the other. No DC sine wave is produced, only a pure sine. For example, a DC motor can be operated, such as a fan for cooling a circuit board. In this example, instead of adding a motor and adding current draw to run a fan motor, this embodiment would run a fan motor off the current that is being used to operate a load.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. An electromagnetic generation circuit that works with a dedicated load in a closed circuit to generate electromagnetic fields comprising;
   a first forward bias diode having an input coupled to an active common hot lead of an alternating current and an output coupled to a first end of a first inductor;
   a first reverse bias diode placed parallel to said first forward bias diode having an input coupled to said active common hot lead of the alternating current and output coupled to a first end of a second inductor;
   a second forward bias diode having an input coupled to a second end of said first inductor and an output coupled to the dedicated load;
   a second reverse bias diode having an input coupled to a second end of said second inductor and an output coupled to the dedicated load;
   wherein all current required by the dedicated load has passed through said first and second inductors maintaining a pure sine wave.

2. The electromagnetic generation circuit according to claim wherein said output of said second forward bias diode and said second reverse bias diode are placed in a series connection and used to become an active hot lead for said dedicated load if the circuit is a split phase or single phase circuit requiring a neutral.

3. The electromagnetic generation circuit according to claim 1 wherein said first and second inductors generate electromagnetic fields externally from the dedicated load.

\* \* \* \* \*